Reissued Jan. 25, 1938

Re. 20,638

UNITED STATES PATENT OFFICE 20,638

ALLOY

Robert H. Leach, Fairfield, Conn., assignor to Handy & Harman, New York, N. Y., a corporation of New York No Drawing. Original No. 2,019,984, dated November 5, 1935, Serial No. 746,273, September 29, 1934. Application for reissue December 3, 1937, Serial No. 178,007

6 Claims. (Cl. 75—175)

This invention relates to alloys used for soldering and analogous purposes, and is concerned more particularly with a novel alloy which has relatively low melting and flow points, and can be used without flux or with less flux than would otherwise be required for producing excellent joints.

The new alloy includes silver, copper, zinc and phosphorus, and may for some purposes also include cadmium. The use of zinc and cadmium in combination produces a more ductile alloy than is obtainable by employing either metal alone, although in some instances it may be desirable to omit the cadmium. Accordingly, by using no cadmium or by varying the amount of cadmium, examples of the new alloy differing in physical properties may be obtained to suit particular needs. The presence of zinc or cadmium or both these metals affects the melting point of the alloy, and in general the higher the proportion of zinc, or cadmium, or both, the lower is the melting point. There is a limit, however, to the extent to which these metals can be employed, while still obtaining an alloy suitable for brazing purposes and giving high strength joints, and I have found that it is not desirable to use an aggregate amount greater than about 40% and for most purposes, a less amount is to be preferred.

The incorporation of phosphorus in the alloy serves a number of purposes. The phosphorus prevents oxidation and permits use of the alloy without a flux or with less flux than would otherwise be required. In addition, it lowers the melting point of the alloy, and improves its flowing properties, so that it enters crevices and seams and produces joints of high tensile strength.

In general, the new alloy consists of the following constituents in the approximate proportions given:

| | Per cent |
|---|---|
| Silver | 30 to 70 |
| Copper | 19 to 35 |
| Phosphorus | 0.5 to 5 |
| Zinc | 10 to 40 |

In the above analysis, it is to be understood that cadmium may be substituted wholly or in part for the zinc. When both zinc and cadmium are present, the amount of zinc should preferably be within the range of 10% to 30%, approximately, and the amount of cadmium within the range of 1% to 20%, approximately.

Specific examples of the new alloy may be given as follows, the proportions being approximate.

*Example No. 1*

| | Per cent |
|---|---|
| Silver | 30 |
| Copper | 30 |
| Zinc | 38 |
| Phosphorus | 2 |

*Example No. 2*

| | Per cent |
|---|---|
| Silver | 50 |
| Copper | 27 |
| Zinc | 22 |
| Phosphorus | 1 |

*Example No. 3*

| | Per cent |
|---|---|
| Silver | 70 |
| Copper | 19 |
| Zinc | 10 |
| Phosphorus | 1 |

Of the specific examples, the alloy having the composition of Example No. 1 has a melting point of 1200° F. and a flow point of 1245° F., but if 15% cadmium is added for an equivalent amount of zinc, the melting and flow points will be 1100° F. and 1108° F., respectively. The alloy in Example No. 2 has a melting point of 1130° F. and a flow point of 1195° F. and the alloy in Example No. 3 has a melting point of 1340° F. and a flow point of 1385° F. In alloys containing over 50% silver and no cadmium, the melting and flow points increase with the percentage of silver, but there is greater ductility and these factors would control the selection of the most desirable composition for a specific application.

What I claim is:

1. An alloy for soldering and similar purposes which consists of silver ranging from about 30% to about 70%, copper ranging from about 19% to about 35%, phosphorus ranging from about 0.5% to about 5%, and zinc ranging from about 10% to about 40%.

2. An alloy for soldering and similar purposes which consists of silver ranging from about 30% to about 50%, copper ranging from about 19% to about 35%, zinc ranging from about 10% to about 40%, and phosphorus ranging from about 0.5% to about 5%.

3. An alloy for soldering and similar purposes which consists of about 30% silver, about 30% copper, about 38% zinc, and about 2% phosphorus.

4. An alloy for soldering and similar purposes which consists of about 50% silver, copper ranging from about 27% to about 34%, zinc ranging from about 16% to about 22% and about 1% phosphorus.

5. An alloy for soldering and similar purposes which consists of about 70% silver, about 19% copper, about 10% zinc, and about 1% phosphorus.

6. An alloy for soldering and similar purposes which consists of silver ranging from about 50% to about 70%, copper ranging from about 19% to about 35%, zinc ranging from about 10% to about 40%, and phosphorus ranging from about 0.5% to about 5%.

ROBERT H. LEACH.